Nov. 3, 1970  E. C. GEAR  3,538,251
LIQUID FILM DISPLAY METHOD AND APPARATUS
Filed June 9, 1967  2 Sheets-Sheet 1
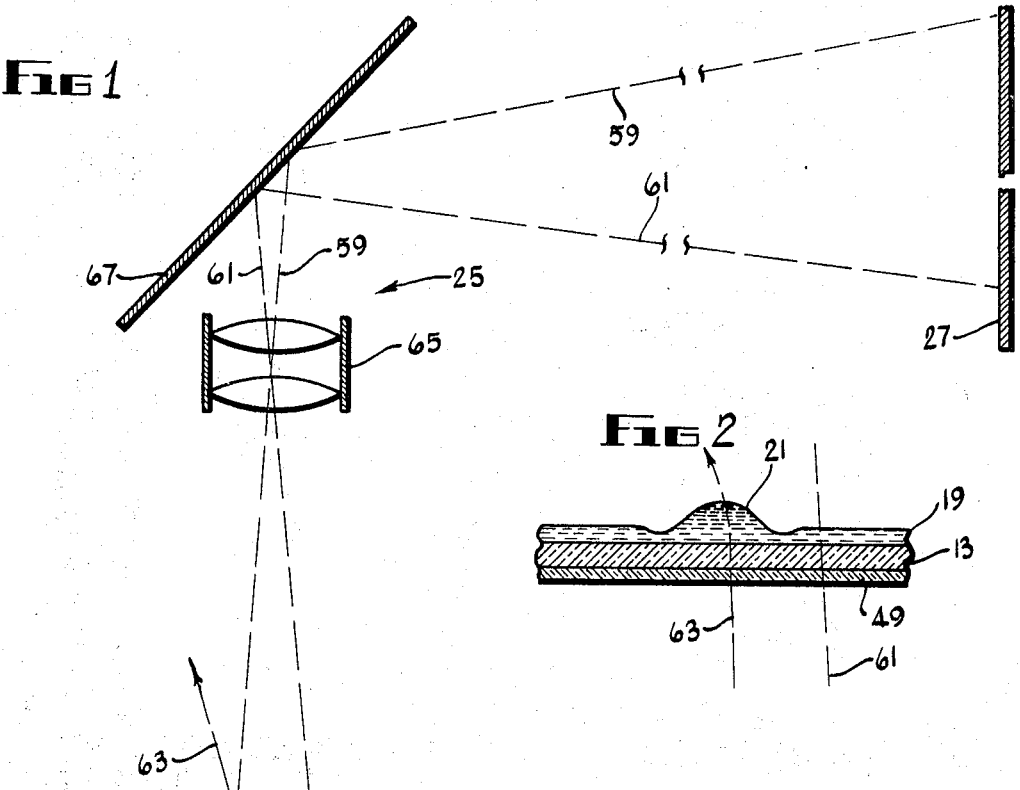
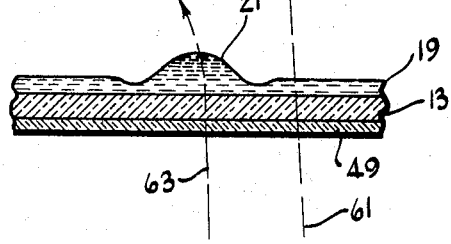
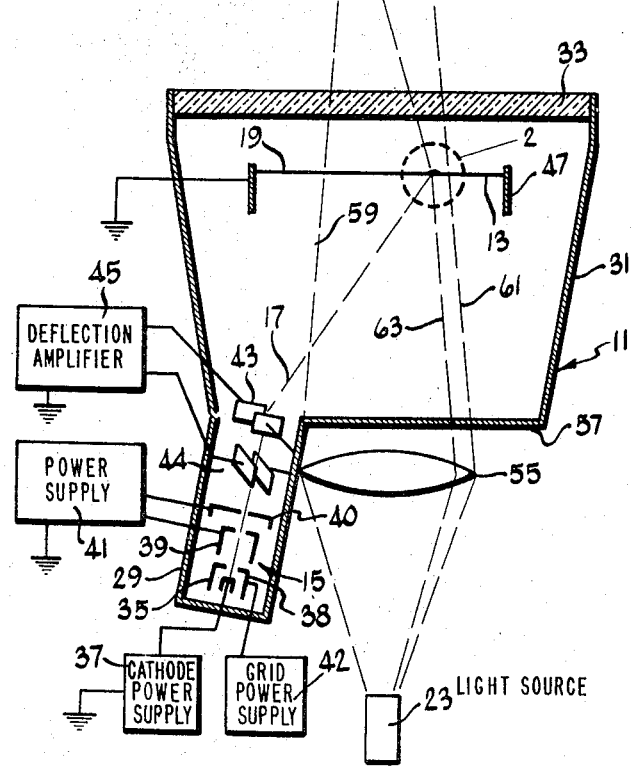
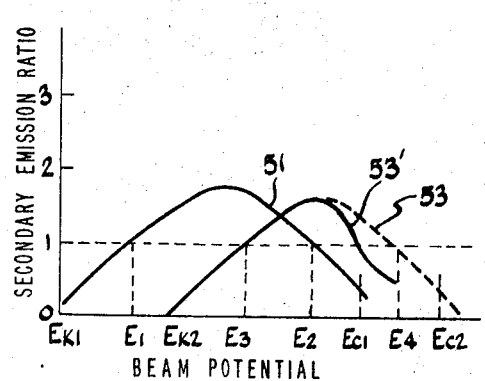
INVENTOR
ELI C. GEAR
Anderson, Luedeka, Fitch, Even & Tabin
ATTORNEYS

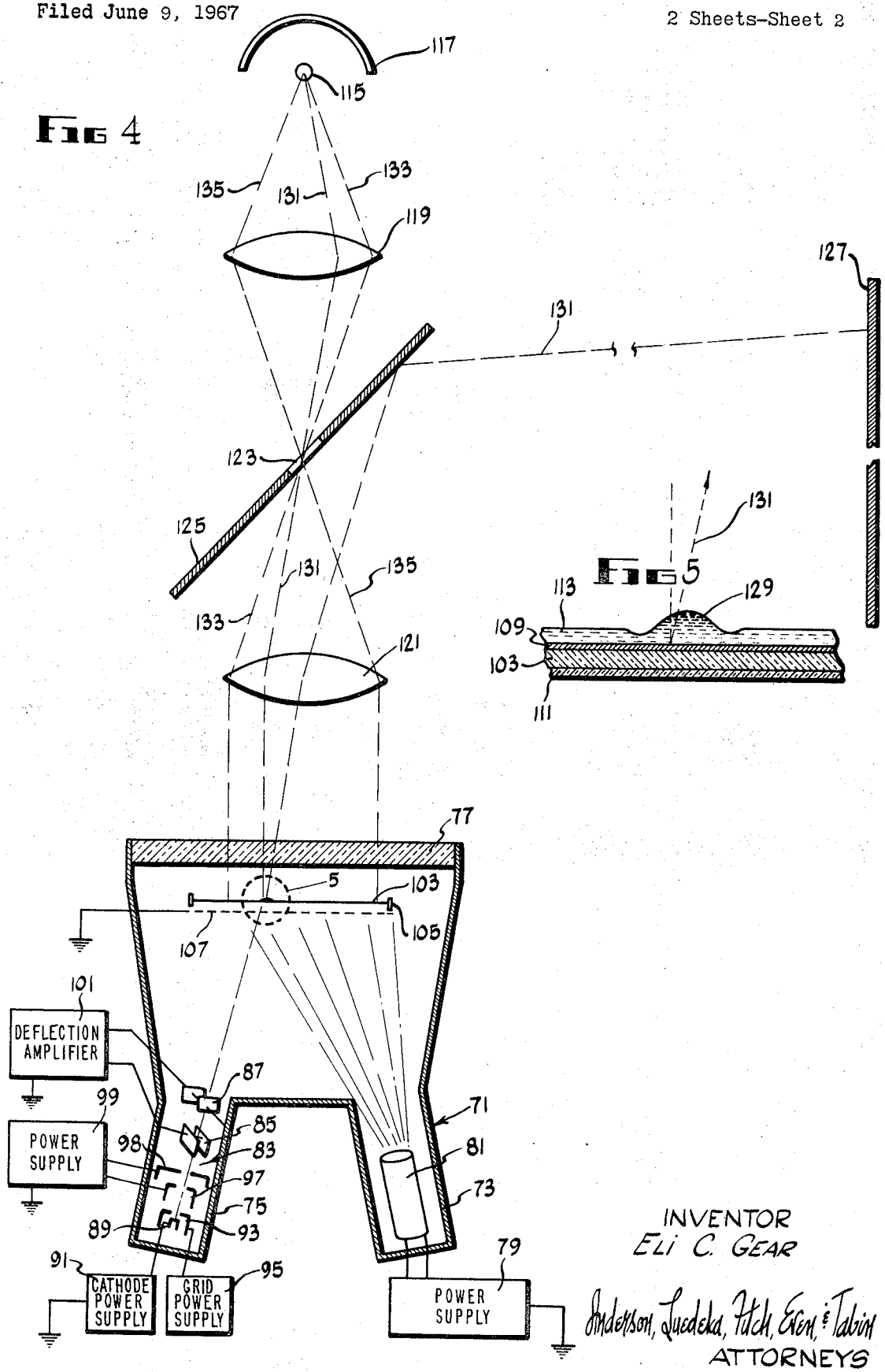

United States Patent Office 3,538,251
Patented Nov. 3, 1970

3,538,251
**LIQUID FILM DISPLAY METHOD
AND APPARATUS**
Eli C. Gear, San Diego, Calif., assignor, by mesne assignments, to Stromberg Datagraphics Inc., San Diego, Calif., a corporation of Delaware
Filed June 9, 1967, Ser. No. 644,837
Int. Cl. H01j *29/89;* H04n *3/16;* G02f *1/30*
U.S. Cl. 178—7.87
16 Claims

ABSTRACT OF THE DISCLOSURE

The embodiments illustrated include a thin dielectric membrane upon one surface of which is disposed a relatively even layer or film of liquid. An electron beam modulated by the intelligence to be displayed is directed at the membrane on the side opposite the liquid film to thereby disturb its surface contour in a manner and at a location determined by the intensity and point of impact of the electron beam. Light rays directed at the film are dispersed by the disturbed contour of the film while uneffected light rays are projected on a screen.

---

This invention relates generally to a method and apparatus for providing large screen displays, and relates more particularly to a method and means in such large screen display apparatus for modulating the light energy directed at the screen, in a controlled manner and according to electric signals.

It is desirable in large screen display apparatus that the intensity of the light impinging on the screen not only be modulated in accordance with the electrical intelligence supplied, but the modulation preferably should be accomplished in a manner which produces sufficient display brightness, high resolution and reasonable contrast qualities. The attainment of such criteria is relatively difficult especially when the display media is a screen having a relatively large surface area. It is further desirable that such display apparatus have a relatively short up-date time to permit the display of constantly changing images and alternatively include storage and selective erasure capabilities so that images may be retained for a sufficient duration to permit visual observation of details or for photographing.

A main object of the invention is to provide an improved method and apparatus which is particularly adapted for displaying relatively large images upon a projection screen. A further object is to provide a display apparatus for providing images of improved brightness and contrast coupled with high resolution. It is a still further object of this invention to provide a display apparatus having a short up-date time and including storage and selective erasure capabilities.

Other objects and advantages of the present invention will become apparent through reference to the following description and accompanying drawings, in which:

FIG. 1 is a diagrammatic illustration of a liquid film display apparatus embodying certain features of this invention;

FIG. 2 is an enlarged fragmentary of a portion of the apparatus illustraed in FIG. 1;

FIG. 3 is a graphical representation of certain physical characteristics of a component of the apparatus illustrated in FIG. 1;

FIG. 4 is an alternate embodiment including certain features of this invention; and, FIG. 5 is an enlarged fragmentary view of a portion of the apparatus illustrated in FIG. 4.

Briefly, the apparatus illustrated in FIG. 1 includes an evacuated tube 11 wherein a thin, transparent dielectric membrane 13 is supported. An electron beam source 15 within the tube 11 generates and directs an electron beam 17 toward one surface of the membrane 13, the other surface of the membrane 13 being coated with a thin liquid film 19. The electron beam 17 scans the membrane 13 and is intensity modulated in accordance with the intelligence supplied. The surface of the film 19 is disturbed by the accumulated charges produced by the electron beam, changing in thickness at the regions of charge variation produced by the electron beam thus forming, in effect, an optical perturbation as at 21 (FIG. 2). The light rays from a light source 23 are directed through the membrane 13 into a suitable optic system 25 and therefrom onto a projection screen 27. The light rays passing through the undisturbed area of the film are projected upon the screen 27 and those rays which pass through the disturbed portion 21 of the film 19, which corresponds to the point of application of the electron beam, are refracted out of the optic system 25 producing a darkened area upon the projection screen 27. In this manner, the light cast upon the screen 27 is modulated in accordance with the intelligence supplied, providing a visual display in accord therewith.

More particularly, the evacuated tube 11 includes a neck portion 29 and a generally frusto-conical portion 31, the neck portion being integrally connected to the frusto-conical portion adjacent the edge of the smaller diameter end thereof. The larger diameter of the frusto-conical portion 31 is provided with a plate 33, which in the illustrated embodiment is preferably optically flat so as to prevent distortion of the light rays passing therethrough. The electron gun 15, which may be of conventional construction, is located in the neck portion 29. The electron gun 15 includes a cathode 35, which is connected to a power supply 37 of conventional construction, a grid 38, and accelerating and focusing anodes 39 and 40 connected to a suitable power supply 41. The kinetic energy or velocity of the electrons in the electron beam 17 is changed to cause erasing or permit writing of intelligence, as described hereinafter, by selecting the potential of the cathode 35 with respect to the membrane 13. The electron beam 17 is maintained off or turned on to write, as hereinafter described, by the control grid 38 connected to a control grid power supply 42 which is in turn modulated in accordance with the intelligence to be displayed. Positioned within the neck portion 29 of the tube 11 are a pair of X and a pair of Y beam deflection plates 44 and 43 respectively. The plates are supplied with deflection potentials, as described hereinafter, by beam deflection amplifiers 45.

The beam deflection amplifiers 45 are controlled as, for example, in time sequence with the intelligence to be displayed, so as to cause the beam 17 of electrons to scan the membrane 13 which is in the form of a thin substantially non-deformable dielectric sheet which, in the illustrated embodiment is transparent. Suitable materials for the membrane are mica, aluminum oxide, silicon monoxide, etc. The membrane 13 is supported in a plane nominally parallel to and spaced slightly away from the faceplate 33 of the tube 11 by a secondary electron collector ring 47 which, in turn, is supported by the tube. The surface of the membrane 13 disposed toward the electron gun 15 is, in the illustrated embodiment, covered with transparent material 49, which emits secondary electrons when electrons from the electron gun 15 impinge thereon for a purpose which will hereinafter be more clearly described. The collector ring 47 is maintained at a fixed potential so as to collect the secondary electrons. The secondary emitting material 49 preferably is selected so that the ratio of secondary electrons emitted to impinging electrons is greater than unity for a certain selected range of impinging electron energies and decreases below unity for a different range of energies. Suitable materials are thin transparent films of conductive materials, such as copper, aluminum, etc. or of insulating material such as magnesium fluoride, magnesium oxide, etc. In certain applications, the material of the membrane 13 itself may be selected to provide the secondary emitting characteristics. If a conductive material is employed for the secondary emitting material 49, it is in the form of discrete conductive dots insulated from each other to prevent dissipation of the charge.

FIG. 3 illustrates the secondary emitting characteristics of a typical secondary emitting material 49, suitable for use in the illustrated embodiment. When the collector ring 47 is substantialy more positive than any potential ever found on the membrane's surface, so that nearly all secondary electrons are collected by the ring and the cathode 35 is at potential $E_{K1}$, the units of the graphical ordinate of curve 51 (hereinafter referred to as the write curve) in FIG. 3 represent the ratio of those electrons leaving the surface of the material 49 to the impinging electrons. The graphical abcissa represents the accelerating potential of the electrons impinging upon the secondary emitting surface 49. As illustrated in the graph, between beam potentials $E_1$ and $E_2$ a greater number of electrons are caused to leave the secondary emitting surface 49 than impinge thereon. This condition causes the emitting material to charge in a positive direction, which in turn increases the accelerating potential. When the beam potential exceeds the voltage $E_2$, the number of impinging electrons supplied by the electron beam exceeds those leaving the secondary emitting surface thereby causing the emitting material 49 to charge in a negative direction at the point of impact of the electron beam.

If the cathode were placed at a more positive potential $E_{K2}$, and the potential of the collector ring 47 were moved positively an equal increment from $E_{C1}$ to $E_{C2}$, a "new" curve 53 is obtained, shown beginning at $E_{K2}$ in a solid line and ending in a broken line. This new curve 53 has the same shape as the write curve 51; it is simply translated to the right. It does not change as it is a function of the type of secondary emitting material 49. If, however, the cathode voltage is changed to $E_{K2}$ and the collector ring voltage is held at $E_{C1}$, a curve 53' (shown in FIG. 3 in solid lines and hereinafter referred to as the erase curve) is obtained. While the secondary emitting surface 49 has a secondary emission ratio greater than unity for beam potentials between $E_{C1}$ and $E_4$ (curve 53), many of these secondary electrons return to the surface 49 rather than to the collector ring 47, since the surface potential of the surface 49 is more positive than the collector ring 47. Thus, the net secondary current to the collector ring 47 is less than the beam current striking the secondary emitting surface 49. The erase curve 53' thus represents net current rather than emission current.

In operation, the secondary emitting surface 49 is conditioned or erased for acceptance of intelligence by setting the cathode to $E_{K2}$ and the collector ring 47 to $E_{C1}$, thus causing operation on the erase curve 53'. The beam 17 is turned on and the secondary emitting surface 49 is scanned in raster fashion by suitably actuating the deflection plates 44 and 43. At each point on the surface 49, the following sequence occurs. Assume the initial potential of the surface 49 at the point is between $E_3$ and $E_{C1}$. The impinging beam results in net secondary emission from the point which is greater than beam or primary current so the point on the surface 49 is charged positively. The point stabilizes at a potential near $E_{C1}$ where the net secondary to primary ratio is unity. If the initial potential is greater than $E_{C1}$, the primary electron current exceeds the net secondary emission current, and the point charges negatively until it reaches the potential near $E_{C1}$ where the net secondary to primary ratio is unity. Thus the entire secondary emitting surface 49 is charged uniformly to a potential near $E_{C1}$, regardless of its original potential. The surface 49 is then said to be "erased."

A charge pattern in accordance with the intelligence signals can then be superimposed on the "erased" surface 49 by setting the cathode potential at $E_{K1}$ and holding the collector ring 47 at $E_{C1}$. Operation is thus along write curve 51. The beam 17 in an off condition is caused to scan the secondary emitting surface 49 or the beam is deflected in an arbitrary or random fashion to a desired region on the surface. At the point where writing is desired, the beam current is turned on by the grid voltage, which is modulated by the intelligence signals. At each point on the surface 49 where the beam current is on, the following sequence occurs. The point is initially at a potential near $E_{C1}$ (the erase equilibrium potential). At this potential, as can be seen from the write curve 51, the secondary emission current is less than the primary or incident beam current. The point is thus charged negatively until it reaches potential $E_2$. At this potential, the point stabilizes since the net current is then zero (primary current equals secondary current). During the write scan, the beam passes over some points in a "blanked" condition, i.e., with zero beam current, the current being cut off by a negative voltage on the grid 38. At such points, the surface potential of the surface 49 remains near $E_{C1}$. In this maner a write scan leaves the "written" points at $E_2$ and the "unwritten" points near $E_{C1}$, the erase potential.

The "erase" and "write" conditions may be interchanged. The cathode voltage specified above for erase could be used for write, provided the cathode voltage specified for write were used for erase. It is only necessary that the equilibrium point in one scan be a different potential than the equilibrium point in the other scan. If some points are left at one potential and other points are at the other potential, a poential gradient or electric field is established at each boundary between points of different potential. As explained hereinafter, the electric field, in turn, produces the deformation of the liquid film 19.

As previously mentioned, the upper surface of the membrane 13, which preferably is made optically flat, supports the thin liquid film 19. A suitable liquid for this application is silicone oil of the type used in vacuum pumps, however, other dielectric liquids may also be appropriate. In a particular embodiment, the membrane 13 is made of mica having a thickness less than 5 mils and the liquid film thickness is between .5 and 5 mils. The surface contour of the liquid film 19 is locally disturbed where the secondary emitting surface 49 becomes charged to a potential different from the surrounding potential, thereby producing a local electrostatic field. In this connection, the surface of the film 19 becomes distorted as the secondary emitting surface 49 becomes either negative or positive with respect to the surrounding area. While there is some uncertainty as to the physical phenomenon involved, each of the illustrated apparatus are believed to operate upon the principle of dielectrophoresis. The dielectrophoresis effect is the name given to the molecular motion caused by the polarization of molecules in a non-uniform field. The influence of electric fields upon a material such as a fluid film causes the film molecules to form dipoles within the field. Since an electrostatic dipole has a finite separation of equal positive and negative charges, such a dipole will be aligned with the field which causes it. Because the field is non-uniform, i.e., it is greater at one end of the dipole than the other, less force is applied at one end of the dipole. The dipolar molecules therefore tend to move toward the region of strongest field. When the molecules form a portion of a fluid film, they will cause the thickness of the fluid to increase in the vicinity of the strongest field, and thus will disturb the surface contour of the film. It is believed that this effect is the dominant physical principle involved in the operation of the illustrated embodiments. However, certain other physical phenomenon may be present, such as, the effect of electrophoresis of the fluid, which in turn causes a force on the fluid about the point of application of the electron beam. The various phenomenon mentioned are discussed by H. A. Pohl in the "Journal of Applied Physics," volume 32, p. 1784, 1961.

As illustrated in FIG. 1, the light source 23 is in the form of an arc lamp, the light from which is directed by a condensing lens 55 towards the exposed surface of the secondary emitting material 49. The back of the tube envelope is provided with a generally planar surface 57 which is parallel to the faceplate 33 and serves to facilitate transmission of light into the tube 11. The light from the lamp 23 passes through the emitting material 49, the membrane 13 and oil film 19 and into the optic system 25. For purposes of discussion, several typical light rays 59, 61 and 63 are illustrated in FIGS. 1 and 2. The entering rays 59 and 61 which pass through undisturbed portions of the oil film 19 pass directly into a projection lens 65 of the optical system 25. The rays are reflected from a mirror 67 onto the display screen 27. The entering ray 63 which is directed into the disturbed area 21 of the liquid film 19 is refracted by the lens action of the thickened film so that its exit path is altered to such an extent that it does not pass into the projection lens 65 and therefore does not illuminate the screen 27. Thus, those areas of the liquid film 19 at which an electric field gradient is established produce darkened areas upon the projection screen 27. In this manner a viewable image is produced upon the screen 27 which corresponds to the intelligence supplied to the power supply 42.

The apparatus illustrated is adapted for random, alpha numeric character presentations as well as for raster scan presentations of the television type. In random presentation mode of operation, the beam, in an off condition, is deflected in an arbitrary or or random fashion to a desired region on the membrane 13. At the desired region the beam is turned on and the intelligence (e.g., a character) is written by curvilinear or line segment strokes. In the raster scan presentation mode of operation, the beam, in an off condition, is deflected so as to scan the membrane 13 in raster fashion. The beam is turned on at suitable times during the scan to write the desired intelligence.

In the alternate embodiment illustrated in FIG. 4, the light beam is reflected rather than being transmitted through the membrane. This embodiment includes an evacuated envelope 71 similar to that shown in FIG. 1, but which is shaped to define two necks, namely, a flood gun neck 73 and an electron beam gun neck 75, the axes of which intersect to form an acute angle as illustrated in FIG. 4. The envelope 71 also includes a preferably optically flat faceplate 77 disposed at the end of the tube opposite the gun necks 73 and 75. Housed within the flood gun neck 73 and energized by a suitable power supply 79 is a flood gun 81 which is directed towards the faceplate 77 as will subsequently be further described. Mounted within the beam neck 75 is an electron gun 83 and pairs of X and Y beam deflecting plates 85 and 87, respectively, of constructions similar to that previously described in connection with the embodiment of FIG. 1. The electron gun 83 includes a cathode 89 connected to a suitable cathode power supply 91 and a control grid 93 the potential of which is determined by a grid power supply 95. The electron gun 83 further includes accelerating and focusing anodes 97 and 98 suitably powered by power supply 99. The X and Y deflection plates 85 and 87 are provided with suitable voltages by amplifiers 101.

Mounted parallel to and spacially adjacent the tube faceplate 77 is a membrane 103 supported in place by a support ring 105. Mounted parallel to the membrane 103 upon the side oposite the faceplate 77 is a secondary electron collector screen 107 maintained at a suitable potential to collect the secondary electrons. If desired, the collector ring construction illustrated in connection with the previous embodiment may be used in place of the collector screen 107.

Referring to the enlarged fragmentary view of FIG. 5, the membrane 103 is preferably constructed of a thin dielectric material. The surface of the membrane 103 disposed toward the faceplate 77 is coated with a thin, light-reflective mirror 109 of dielectric material such as alternate thin layers of magnesium fluoride and zinc sulphide. Coated on the surface of the dielectric membrane 103 farthest from the faceplate and adjacent the collector screen 107 is a layer of secondarily emissive material 111 which may be similar to that used in the embodiment of FIG. 1, except that it need not be transparent. As previously mentioned, in connection with the preceding embodiment, the secondary emitting layer 111 may be eliminated and the material of the membrane 103 selected to exhibit the necessary secondary emissive qualities. Dispersed on the reflective material 109 is a thin liquid film 113 such as silicone oil.

The upper surface of the membrane 103 is illuminated by a light source 115 in the form of an arc lamp positioned in front of a spherical reflector 117. The light from the source 115 passes through a projection lens 119 having its focal point coincident with the focal point of a collimating lens 121 which provides parallel light rays for illumination of the upper surfacce of the dielectric membrane 103. The lenses 119 and 121 are mounted upon a common axis. Positioned at the coincident focal point of these lenses 119 and 121 is an aperture 123 defined by a reflecting mirror 125, the planar surface of which forms an angle approximately 45° with the common axis of the lenses 119 and 121. Positioned to receive the light reflected from the mirror for display thereof is a projection screen 127.

In operation erasure can be quickly accomplished by turning on the flood gun 81 with high beam current, or the image can be made to gradually fade by turning on the flood gun 81 with low beam current. The flood gun 81 showers the secondary emitting surface 111 with electrons, the result of the impingement of the flood of electrons on the emitting surface 111 being similar to that described above in connection with FIG. 3. The flood gun's cathode is set to operate at a potential corresponding to $E_{K2}$ of FIG. 3, hence the surface 111 responds to the flood electrons according to curve 53'. All points on the surface 111 are thus charged to a uniform potential near $E_{C1}$, the potential of the collector screen 107. The flood gun is then turned off and the electron beam emitted by the electron gun 83 is then positioned or scanned in accordance with the intelligence supplied to the plates 85 and 87 in a manner similar to that previously described in connection with the previous embodiment. The cathode supply 91 provides a potential corresponding to $E_{K1}$ and the surface 111 responds to the electron beam from the write gun 83 according to curve 51 of FIG. 3. To write, the beam of gun 83 is turned on selectively and a potential pattern corresponding to potential $E_2$ of FIG. 3 is produced on the surface 111 in accordance with the intelligence provided. The resulting charge pattern creates voltage gradients upon the membrane 103 and within the fluid layer 113. These field gradients cause perturbations of the oil film as at 129 due to the dielectrophoresis effect previously discussed.

An image can be stored by first erasing (with high flood gun current), then turning off the flood gun 81, and writing an image with the write gun 83. With the flood gun 81 off, the image will remain for many minutes. Simultaneous erasing (with low flood current) and continuous sequential writing results in an image in which the older information (first written) is faded and the newer information (most recently written) has high contrast. Selective erasure can be accomplished by switching the cathode 89 of electron gun 83 from $E_{K1}$ to $E_{K2}$, directing its beam at a particular point on the surface 111 and turning the beam on. The point is thus restored to the background potential near $E_{C1}$ and disappears from the projected image.

For purposes of subsequent discussion, three typical light rays have been illustrated and are designated 131, 133 and 135. The rays 131, 133 and 135 which emanate from the light source 115 pass through the lens 119, the aperture 123, and the lens 121. The rays are collimated and are projected upon the oil film 113 generally normal to the surface thereof. The rays 133 and 135 pass through the oil film 113 and are reflected by the reflecting surface 109 back along their incident path. Since the liquid film 113 is undisturbed at the points of incidence of the rays 133 and 135, neither of the rays will be refracted by the oil film. Thus, the light rays 133 and 135 are "trapped" within the optic system and will return through the mirror aperture 123. The incident ray 131 which is normal to the membrane 103, passes through the film 113 and is reflected by the reflecting surface 109. However, since both the incident ray 131 and the reflected ray 131 are refracted by the disturbed surface of the oil film 113 it passes through the lens 121 and against the reflective surface of the mirror 125 wherefrom it is directed onto a viewing screen 127. In this manner those portions of the liquid film 113 which have been disturbed by the field gradient created by the writing beam produce illuminated areas upon the screen 127 thereby providing a visual display of the electrical intelligence supplied.

Although but two specific embodiments of this invention have been herein shown and described, it should be understood that various of the features of this invention may be altered without departing from the spirit and scope of the invention.

What is claimed is:

1. The method of providing a visual display of electrical intelligence comprising the steps of disposing a dielectric membrane having a first and second surface within an evacuated tube in spaced relation to the walls of said tube, disposing a relatively thin liquid film on said second surface of said membrane in insulated relation to said first surface thereof, directing an electron beam at said first surface of said membrane to disturb the surface contour of the liquid film as a result of the impingement of the electron beam, controlling the intensity of the electron beam in accordance with the electrical intelligence provided, directing a quantity of light at said film so that a visible image of the disturbed portions of the film is produced, and selectively eliminating the disturbed portions.

2. The method of claim 1 wherein the light is passed through said film and said membrane.

3. The method of claim 1 wherein the light is directed through said film at a dielectric mirror disposed between said one surface and said film and is reflected from the mirror back through said film.

4. A display apparatus for the visual display of electrical intelligence comprising an evacuated tube, an electron beam source, means for controlling the deflection and intensity of the electron beam according to said intelligence, a thin dielectric membrane mounted within said tube and spaced from the walls of said tube in a position such that said beam impinges on a first surface thereof whereby said first surface is electrostatically charged by the action of said beam in a pattern representing said intelligence, a liquid film supported upon a second surface of said membrane so that said film is selectively disturbed by the electric fields of said pattern, said second surface being insulated from said first surface, a source of light, means for directing the light rays from said light source at said liquid film so as to produce a visible image of deformations in the surface contour of said film representative of the intelligence provided and means for selectively erasing said pattern.

5. A display apparatus in accordance with claim 4 wherein the membrane is flat and substantially non-deformable.

6. A display apparatus in accordance with claim 4 wherein a display screen is provided and a lens system is provided for projecting light rays passing through undisturbed portions of said film onto said display screen, said light source and said lens system being each located upon opposite sides of said membrane and wherein said membrane is constructed of transparent material so that the light rays from said source are transmitted through said liquid film and said membrane.

7. A display apparatus in accordance with claim 4 wherein a display screen is provided, and a lens system is provided for projecting light rays passing through disturbed portions of said film onto said display screen, said light source and said lens system being each located upon the same side of said membrane and wherein a light reflective layer is interposed between said membrane and said film, the directed light being reflected from said reflective layer.

8. A display apparatus in accordance with claim 4 wherein a secondary emitting material is disposed upon said first surface of said membrane.

9. A display apparatus in accordance with claim 4 wherein said erasing means is a flood gun positioned to direct an electron beam emitted therefrom against said first surface of said membrane.

10. A display apparatus in accordance with claim 8 wherein said erasing means is a flood gun positioned to direct an electron beam therefrom against said secondary emitting surface.

11. In a display apparatus, an evacuated tube including a thin dielectric membrane disposed within said tube in spaced relation to the walls of said tube, means for generating an electron beam and directing the same at a first surface of said membrane, means for controlling the deflection and intensity of the electron beam in accordance with electrical signals, a thin liquid film supported upon the other surface of the membrane, said second surface being insulated from said first surface whereby said film is selectively disturbed by electrostatic charges deposited by said beam and a visible image representative of said signals is thereby produced and means for selectively erasing said pattern.

12. A tube in accordance with claim 11 wherein the membrane is flat and substantially non-deformable.

13. A tube in accordance with claim 12 wherein the first surface of said dielectric membrane exhibits secondary emitting characteristics.

14. A tube in accordance with claim 12 wherein the surface of said membrane disposed toward said electron beam generating means is coated with a material having secondary emitting characteristics.

15. A tube in accordance with claim 12 wherein the surface of said membrane adjacent to said liquid film is coated with one or more layers of dielectric material thereby to make the coated surface light reflective.

16. A tube in accordance with claim 12 wherein said erasing means is an electron flood gun positioned upon the side of said dielectric membrane opposite said liquid film.

References Cited

UNITED STATES PATENTS

| | | |
|---|---|---|
| 3,317,665 | 5/1967 | Perlowski. |
| 3,385,927 | 5/1968 | Hamann _____ 178—7.87 |
| 3,325,592 | 6/1967 | Good et al. _____ 350—161 |

ROBERT L. GRIFFIN, Primary Examiner

D. E. STOUT, Assistant Examiner

U.S. Cl. X.R.

178—7.5; 313—117; 350—161

UNITED STATES PATENT OFFICE
CERTIFICATE OF CORRECTION

Patent No. 3,538,251      Dated November 3, 1970

Inventor(s) Eli C. Gear

It is certified that error appears in the above-identified patent and that said Letters Patent are hereby corrected as shown below:

Column 1, line 5  - for "Stromberg Datagraphics, Inc." read Stromberg DatagraphiX, Inc.'.

Column 1, line 63 - for "illustraed" read "illustrated".

Column 4, line 26 - for "maner" read "manner".

Column 4, line 34 - for "poential" read "potential".

Column 5, line 34 - delete "or" (second occurrence).

Column 6, line 23 - for "surfacce" read "surface"

Signed and sealed this 23rd day of March 1971.

(SEAL)
Attest:

EDWARD M. FLETCHER, JR.
Attesting Officer

WILLIAM E. SCHUYLER, JR.
Commissioner of Patents